United States Patent [19]

Latsch et al.

[11] 4,218,992
[45] Aug. 26, 1980

[54] EXTERNALLY IGNITED INTERNAL COMBUSTION ENGINE

[75] Inventors: Reinhard Latsch, Vaihingen; Hans Schlembach, Mühlacker, both of Fed. Rep. of Germany

[73] Assignee: Robert Bosch GmbH, Stuttgart, Fed. Rep. of Germany

[21] Appl. No.: 871,577

[22] Filed: Jan. 23, 1978

Related U.S. Application Data

[62] Division of Ser. No. 688,051, May 19, 1976, abandoned.

[30] Foreign Application Priority Data

May 22, 1975 [DE] Fed. Rep. of Germany ....... 2522577
Feb. 13, 1976 [DE] Fed. Rep. of Germany ....... 2605738
Apr. 10, 1976 [DE] Fed. Rep. of Germany ....... 2615813

[51] Int. Cl.² .............................................. F02B 19/00
[52] U.S. Cl. ..................................... 123/263; 123/260; 123/293; 123/668
[58] Field of Search ............. 123/30 D, 32 SP, 191 S, 123/191 SP, 191 R, 32 K, 32 L, 169 PA, 32 ST, 191 A, 32 C

[56] References Cited

U.S. PATENT DOCUMENTS

| 1,250,009 | 12/1917 | Ponsot | 123/169 P |
|---|---|---|---|
| 1,833,445 | 11/1931 | Summers | 123/191 L |
| 2,314,175 | 3/1943 | Summers | 123/191 SP |
| 3,092,088 | 6/1963 | Goosisak et al. | 123/191 SP |
| 3,255,739 | 6/1966 | Seggern et al. | 123/32 SP |
| 3,304,922 | 2/1967 | Hideg | 123/30 D |
| 3,416,501 | 12/1968 | Castelet | 123/32 SP |
| 3,648,676 | 3/1972 | Lowman | 123/191 A |
| 3,875,909 | 4/1975 | May | 123/191 S |
| 3,926,158 | 12/1975 | Dolza | 123/32 K |
| 3,974,818 | 8/1976 | Noguchi et al. | 123/32 SP |
| 3,999,530 | 12/1976 | Kunii | 123/191 S |
| 4,029,072 | 6/1977 | Goto et al. | 123/143 B |
| 4,041,922 | 8/1977 | Abe et al. | 123/143 B |

Primary Examiner—Charles J. Myhre
Assistant Examiner—Craig R. Feinberg
Attorney, Agent, or Firm—Edwin E. Greigg

[57] ABSTRACT

An internal combustion engine in which each cylinder or combustion volume includes a separate ignition chamber which communicates with the main combustion chamber through a relatively narrow channel or channels. The combustible mixture is delivered to the separate chamber exclusively through these channels by the compressive action of the piston and is ignited there by a suitable electrical spark, for example. There is no additional admission of fuel or fuel mixture to the separate ignition chamber. The channel or channels terminate in the ignition chamber in such a manner, for example, tangentially, that one or more vortices are generated in the chamber prior to ignition. The channels are so oriented that the emerging igniter flames are directed to potential hot cells in the main combustion chamber where auto-ignition could occur.

13 Claims, 16 Drawing Figures

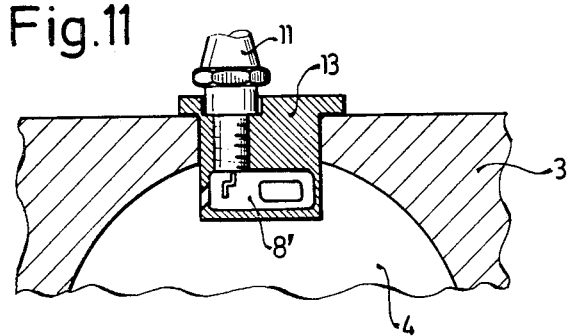
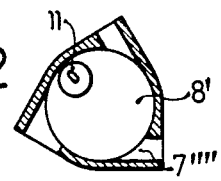
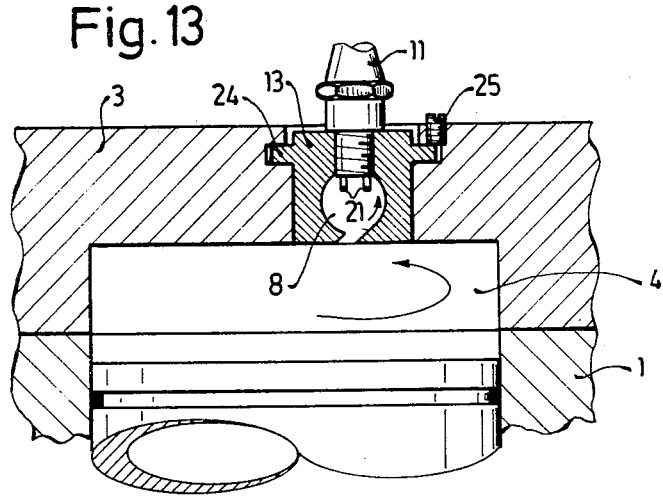
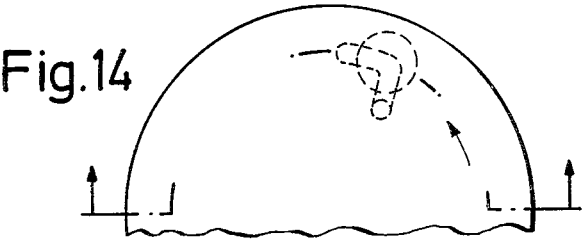

EXTERNALLY IGNITED INTERNAL COMBUSTION ENGINE

This is a division of application Ser. No. 688,051, filed May 19, 1976 now abandoned.

BACKGROUND OF THE INVENTION

The invention relates to an externally ignited internal combustion engine of the type which includes a main combustion chamber and a separate ignition chamber in which the spark plug is located. The main combustion chamber and the ignition chamber communicate through a channel which terminates in the ignition chamber substantially tangentially.

Due to the presence of the ignition chamber, even very lean fuel-air mixtures can still be ignited in the main combustion chamber. The reason for the favorable ignition properties is due to the fact that, instead of having a single electric spark, such as is present in ordinary internal combustion engines, the ignition in the main combustion chamber is initiated by a torch-like jet which bursts out of the ignition chamber. It is this jet which permits a uniform reaction of the charge even when the mixtures used are very lean. The mixture prevailing in the ignition chamber is ignited in known manner by means of a spark plug. In a known process, the ignition chamber is supplied with a substantially richer mixture than that supplied to the main combustion chamber which, in turn, is created by supplying supplementary fuel. In these so-called "stratified charge" engines, any faulty mixture preparation (for example due to soot deposition in the injection valve) may cause excessive enrichment in the region of the spark plug and thus cause ignition failure or incomplete combustion which, in turn, would lead to a deterioration of the power and the purity of the exhaust gases of the engine. These problems which occur in stratified charge engines are magnified because the tangential influx causes centrifugal forces which have an effect especially on the heavier fuel drops in the fuel-air mixture. The same is true for rotary piston engines although, in rotary piston engines, the main combustion chamber rotates at the same rate as the piston.

In order to counteract these above-mentioned difficulties, it has been proposed in a known internal combustion engine of this type to dispose the spark plug in a separate chamber, immediately adjacent to the ignition chamber, into which the enriched mixture flows from the ignition chamber through channels to be ignited. In this last process, there is a danger of the deposition of soot in the very narrow channels as between ignition chamber and separate chamber. Furthermore, no swirl or vortex is created in the ignition chamber so that the reaction velocity of the charge in the ignition chamber is lower than in a swirl chamber design, which again brings disadvantageous characteristics of the energetic reactions in the main charge.

Furthermore, stratifications of the charge of the type described above entail a substantially increased cost because they require a direct injection system with the corresponding requirement for timing the fuel injection, the ignition and correlating these times with the overall timing of the engine.

Also known are engines with an ignition chamber in which very high compression and a high turbulence of a substantial portion of the total charge is supposed to provide the very maximum power. However, these engines exhibit very rough running and relatively unfavorable exhaust gas characteristics. The high compression in the main combustion chamber results in a high mixture temperature which creates so-called hot cells, i.e, regions of especially elevated temperature, so that, in these locations, there is the possibility of auto-ignition of the fuel-air mixture. By creating a rotational motion in the main combustion chamber, such auto-ignition is counteracted but, again, rotational motion coupled with high compression in the main charge leads to a rough-running engine and, furthermore, such a mixture is harder to ignite because it contains vortices of large diameter. Thus, the ignitability, the exhaust gas requirements, the smooth running of the engine, small dead space, power, fuel consumption, etc., all make certain demands on the design and are of such complicated and partially contradictory nature that an optimum compromise among all these requirements is very difficult.

OBJECT AND SUMMARY OF THE INVENTION

It is a principal object of the invention to provide an internal combustion engine of the general type described above which permits separate optimization of the processes taking place in the ignition chamber and the main combustion chamber, respectively. The invention provides that the ignition chamber and the main combustion chamber are separated so that the ignition of the mixture takes place independently in the two chambers. Finally, the invention provides that the influence of events in the ignition chamber on processes taking place in the main combustion chamber is especially to cause a uniform and rapid reaction of the main charge.

These objects are attained according to the invention by providing that the fuel-air mixture which is intended for ignition flows into the ignition chamber from the main combustion chamber exclusively through a channel terminating in the ignition chamber tangentially. The delivery of the charge through the tangential channel creates a cylindrical vortex or a potential vortex and results in a homogeneous admixture of air and fuel without supplementary fuel injection. The displacement of the ignition chamber with respect to the main combustion chamber and the tangential entry of the charge into the ignition chamber causes formation therein of a so-called solid vortex which gradually undergoes transition into a potential vortex which guarantees a homogeneous admixture of air and fuel. It is significant that the homogeneity of fuel thus attained is not subsequently disturbed by injecting supplementary fuel as would be the case in a stratified charge engine. In the region of the boundary layer, the speed of the mixture in the vortex is relatively low and thus particularly small turbulent fluctuations are created, i.e., the linear dimensions of local turbulences are very small. Furthermore, the overall favorable homogeneity of the charge is affected slightly by centrifugal forces which might somewhat enrich the mixture in the region of the boundary layer at the wall. Since the electrodes of the spark plug are located within this wall boundary layer, the conditions for ignition of even very lean fuel-air mixtures are favorable. Since the entire ignition process takes place in the ignition chamber, and is separate from any processes in the main combustion chamber, the latter may be shaped in any desired and optimum manner without being affected by events in the ignition chamber. For this reason, it is possible to ignite mixtures whose air number $\lambda$ is of the order of 1.6 whereas, conventionally, the limit of ignition is λ=1.3. The main reason that very lean mixtures are normally difficult or impossible to ignite is due to their inhomogeneity as well as to the high velocity and large vortex size in the region of the spark plug.

In a favorable embodiment of the invention, the ratio of the volume of the main combustion chamber at the end of the compression stroke to the volume of the ignition chamber is greater than 5 and preferably between 10 and 25. The relatively small volume of the ignition chamber results in several decisive advantages. Firstly, due to the relatively low surface area, the frictional and thermal losses are small as is the tendency for hydrocarbon emissions. For the same reason, the firing channel between the ignition chamber and the main combustion chamber is also kept very short. The length of the channel is limited by criteria including the materials used and the necessity to eliminate glow ignition at relatively hot points of the channel. Furthermore, the ignition extends over a relatively short length of time when the ignition chamber is small so that the so-called ignition delay for the main charge is also kept small and this is very favorable, especially at high engine rpm, inasmuch as the compressed main mixture is ignited substantially from its edge regions. If the apparatus according to the invention is used in rotary piston engines, the flame emerging from the ignition chamber extends over the main combustion chamber long enough to insure a rapid and reliable combustion of the main charge. Since the rotation of the charge in a small ignition chamber is smaller than would be the case in a large one, thermal losses at the wall are also reduced and, furthermore, the initial pressure increase at the onset of ignition is smaller, which makes the engine operation smoother and results in a reduced mechanical stress of the involved parts of the engine. The smaller the ignition chamber, the smaller is the size of the potential vortex created therein which, in turn, is made up of a large number of smaller vortices, so-called dispersion vortices, whose dimensions are proportional to the main or potential vortex. The ignitability of the vortices depends on their size and the smaller and more minute they are, the more homogeneous is the mixture and the easier it is to ignite it. When regarded from the viewpoint of matter and momentum exchange, the flows prevailing in a small ignition chamber are more orderly, especially in the region of the wall, where very small vortices prevail, resulting in more favorable ignitability than would be the case in a larger ignition chamber. All these observations are important adjuncts of the invention.

In one additional embodiment of the invention, the ratio of the projections of the cross section of the channel to that of the ignition chamber is 0.1 to 0.4, and preferably 0.15 to 0.3. When the ratio is of this order of magnitude, a sufficient decoupling of the ignition chamber from the main combustion chamber is guaranteed and any disadvantageous influence of the two chambers on each other is thereby avoided.

In accordance with an embodiment of the invention which is not confined to the internal combustion engine as described but may also be used, e.g. in stratified charge engines, the central portion of the ignition chamber contains a core which extends from one wall to the other. Since the translational motions of particles in a vortex are very small in the center, the danger of autoignition would be highest there. The core prevents this danger, especially for ignition chambers which are disc-shaped.

Another embodiment of the invention, also not limited to engines previously described, includes additional bores or channels which lead from the ignition chamber to locations within the main combustion chamber that are thought to be potential hot cells. These hot cells are often the cause of detonation or pinging. By providing the additional bores aimed at potential hot cells, the charge in those locations is combusted early and results in a controlled behavior of the entire ignition process.

Yet another embodiment of the invention, which is not confined only to application in engines of the type described here, provides that several channels between the ignition chamber and the main combustion chamber are so arranged that two separate vortices of opposing direction of rotation are formed within the ignition chamber. The border region between the two vortices will thus acquire a particularly high degree of turbulence and flame velocity due to the very high velocity gradient between the two vortices at this point. The very rapid reaction in the charge, which is very favorable especially for stratified charge engines, results in relatively late ignition times which are favorable for optimum power and which represent a good approximation to the so-called constant volume combustion process and thus provides the combustion with a tendency to avoid detonation. The geometrical conditions of such an ignition chamber are also favorable because they permit separate direction of the flaming jet into the combustion chamber since each vortex is associated with a separate firing channel leading in opposite directions.

In yet another embodiment of the invention, the upper edge of the electrode of the spark plug lies within the boundary layer of the wall of the ignition chamber and approximately opposite the termination of the connection channel in the ignition chamber. If the ignition chamber includes multiple vortices, the main electrode of the plug may be made appropriately long, or several locations for ignition are provided. Inasmuch as the combusted gases tend to flow to the center of the ignition chamber after ignition has taken place, uncombusted mixture is pulled past the spark plug and thus a particularly favorable complete ignition of the entire mixture takes place. The core of the flame remains associated with the plug and this has a favorable effect on the stability of the initiation of ignition and on the speed of the reaction. When vortices of opposite rotation are present, the velocity gradient is very high both between the vortices as well as in the wall boundary layer and this is also favorable for the initiation of ignition. When the invention is used, the ignition delay (the time between the occurrence of the spark and the propagation of the flame front) is much lower than usual and, due to the very intense vortex motion of the charge, the reaction time in an ignition chamber having a double vortex is much higher than in customary ignition chamber systems. Due to the very abrupt increase of the pressure, the combustion process comes close to being an ideal process, i.e., the constant volume process of the theoretical Otto engine. Yet another advantage is that the point of ignition most favorable for optimum power is independent of rpm and of load or induction tube pressure.

Since the charge exchange in the turbulence chamber is orderly and approximately proportional to rpm, the ignition and combustion in the main combustion chamber is also favorable because the flame shooting out of the turbulence chamber has a positive influence on the main combustion chamber processes but does not require that the main combustion chamber be made especially suitable due to the requirements of ignition. This is especially true for rotary piston engines. Therefore, the cyclic fluctuations of combustion are very low even when a lean mixture is burned in the two combustion chambers. The tendency of the motor to knock under full load is also substantially reduced. When several connection channels are present, the combustion process in the main combustion chamber is similar to multiple ignition which increases the reaction rate of the charge in the main combustion chamber and thus favorably influences the efficiency. The use of the invention in stratified charge engines results in substantial advantages, yet the unfavorably high emission of hydrocarbons of such engines which is normally encountered is not found when the invention is used therein due to the especially homogeneous charge provided by the invention. Similar advantages are obtained with respect to the emission of nitrogen oxides because the partial admixture of rich and lean mixtures in ordinary stratified charge engines is avoided so that somewhat hyperstoichiometric compositions whose combustion would lead to very high concentrations of nitrogen oxides are avoided.

The invention will be better understood as well as further objects and advantages thereof become more apparent from the ensuing detailed specification of a number of preferred embodiments taken in conjunction with the drawing.

BRIEF DESCRIPTION OF THE DRAWING

FIGS. 1, 2, 11, 12, 13 and 14 depict different preferred embodiments of ignition chambers according to the invention;

DESCRIPTION OF THE PREFERRED EMBODIMENTS

Figure 1:
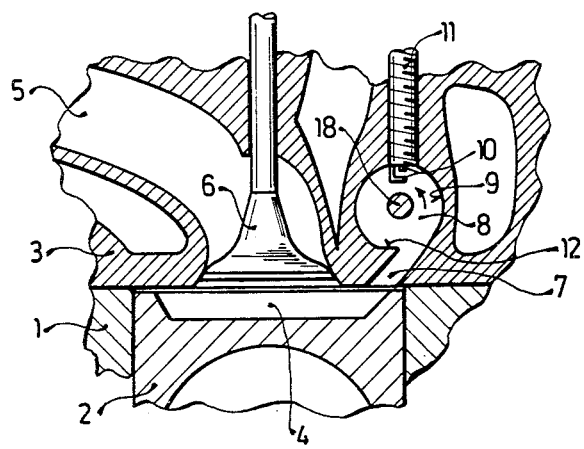
Figure 2:
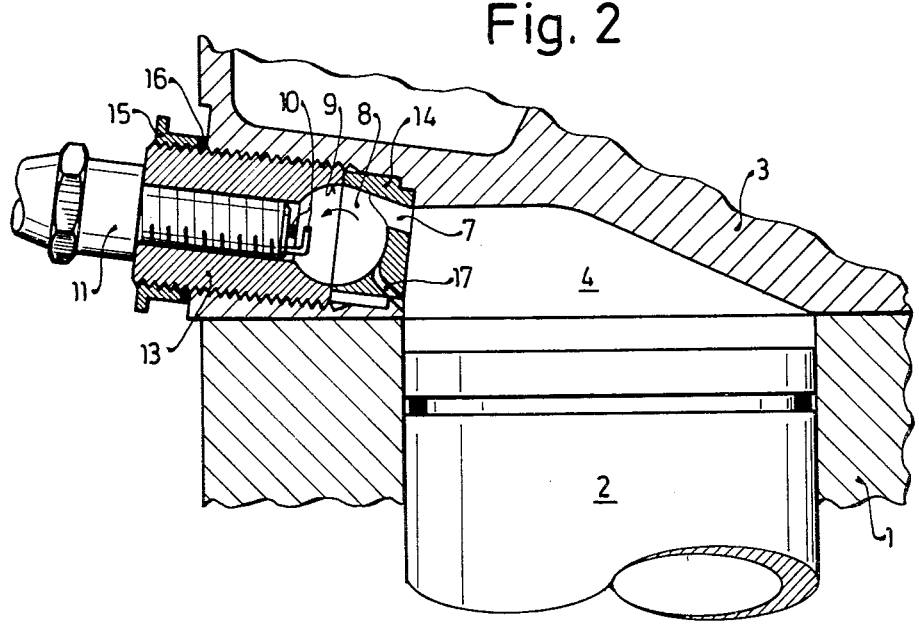

Turning now to FIGS. 1 and 2, there are shown sections of an internal combustion engine which illustrate one possible location of the apparatus according to the invention. An engine cylinder 1 has a piston 2 whose top 3 defines the main combustion chamber 4. A relatively lean fuel-air mixture is admitted during the suction stroke of the piston 2 into the main combustion chamber 4 through the induction tube 5 and the inlet valve 6. The fuel preparation means are not shown in either figure.

When the piston 2 moves during its compression stroke, a portion of this lean fuel-air mixture flows through a connection channel 7 into an ignition chamber 8. The terminus of the connection channel 7 in the ignition chamber 8 is tangential thereto so that an orderly vortex flow is formed in the ignition chamber 8. The boundary layer of the fuel-air mixture in the vicinity of the wall 9 engages the electrode 10 of a spark plug 11 where it is ignited. Due to the low speed of the boundary layer and due to the very homogeneous admixture of the fuel-air mixture and any residual gases, even very lean mixtures are capable of being ignited. The relatively small volume of the ignition chamber 8 insures that the dispersion vortices, i.e., the constituent swirls which form the main vortex, are very small and thus favor ignition. Due to the characteristics of the potential vortex which is generated, any hot, i.e., ignited, fuel-air components, migrate to the center of the ignition chamber so that unignited constituents flow toward the ignition chamber wall and thus enter the region of the electrode 10. The flow follows a spiral path, as indicated by arrows, from the spark plug to the center of the chamber. Even after the electrical spark has expired, ignition continues to take place because of the so-called flame-retaining effect at the point of ignition. Ignition also takes place due to the spirally propagating flame by convection with uncombusted gas. Shortly after the ignition of the mixture in the ignition chamber, the flame shooting through the connection channel 7 causes ignition of the similarly lean fuel-air mixture in the main combustion chamber 4. Because of the very intense flaming jet emerging from the connection channel 7, even very lean mixtures up to an air number $\lambda = 1.6$ are still ignitable (air number proportional to the ratio air/fuel). In order to obtain the advantages described above, it is necessary to make the volume of the ignition chamber as small as possible compared to the residual volume of the main combustion chamber at top dead center. The ratio of the combustion chamber volume to that of the ignition chamber should be higher than 5 and a value of 10 to 20 has been shown to be especially favorable. The shape of the ignition chamber could be spherical, cylindrical or, as shown in FIG. 1, bell-shaped, including a flat face portion 12 interrupted by the connection channel 7. The presence of the flat surface results in a reduction of the vortex speed in the vicinity of the spark plug which favors the ignition onset due to the creation of a homogeneous mixture.

In order to obtain a high exit velocity of the hot gases from the ignition chamber into the main combustion chamber, it is suitable to slightly enlarge the connection channel 7 in the direction of the main combustion chamber. This construction is shown in FIG. 1 and when the connection channel is embodied in this manner, somewhat as a kind of Laval nozzle, the speed of the gas may exceed the speed of sound for high rpm.

The vortex which is generated in the ignition chamber exhibits a relatively small gas motion in the center so that the possibility of auto-ignition is high in the center of the vortex, especially for high compression ratios. Auto-ignition is undesirable because the onset of ignition is unpredictable. In order to prevent auto-ignition, the exemplary embodiment shown in FIG. 1 exhibits a material core 18 disposed in the center of the ignition chamber, and extending from one wall to the other coaxially with the axis of rotation of the vortex. A central core 18 of this type, which prevents auto-ignition, is an advantage not only in the ignition chamber of the invention, but quite universally for any type of ignition or swirl chamber, even for those used with stratified charge engines. The material center 18 is also very advantageous when the swirl chamber has the shape of a disc.

The second preferred exemplary embodiment shown in FIG. 2 is different from that shown in FIG. 1 principally by including an insert composed of parts 13 and 14. The part 13 is a threaded member which is intended to clamp the part 14 within the cylinder head 3. The part 14 includes the connection channel 7 which creates a communication between the main combustion chamber 4 and the swirl chamber 8 and the part 13 is adapted to hold the spark plug 11. Both part 13, as well as the spark plug 11, are accessible from outside of the engine. A lock nut 15 prevents loosening of the part 13 and a copper gas seal 16 may also be provided. This embodiment may be altered by welding the parts 13 and 14 together permanently, in which case the screw threads on the part 13 would extend completely down to the combustion chamber 4. In such a case, an external mark would indicate the orientation of the injection channel 7 with respect to the main combustion chamber 4.

It is known that, in places of gas transition between the combustion chamber 4 and the cylinder head 3, so-called hot cells may be formed. These are places in which the motion of the mixture is relatively slow, for example dead corners, and these places may be sources of auto-ignition which leads to fuel detonation and pinging. As illustrated in FIG. 2, hot cells may be made ineffective by the provision of additional channels 17. On the one hand, these additional channels 17 generate a more vigorous motion of the fuel-air mixture in the dead spots and, secondly, the mixture in these places is now ignited by a flare aimed at them through the additional channels 17. Such additional channels may be used not only in internal combustion engines of the type described here, but in any internal combustion engines which include ignition or swirl chambers, even stratified charge engines.

Figure 3:
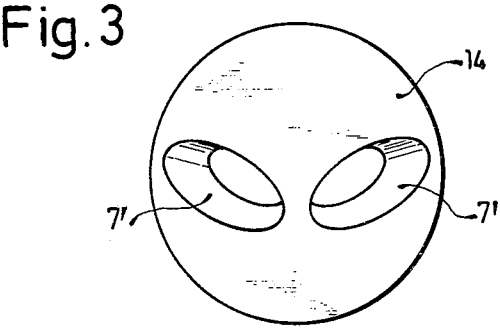
FIGS. 3-10 depict different dispositions of the connection channel and of the ignition means.
Figure 4:
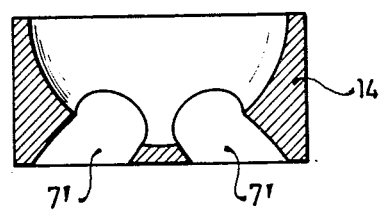
Figure 5:
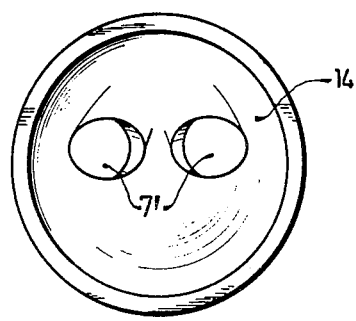

FIGS. 3, 4 and 5 are diagrams illustrating in enlarged manner a part 14 and the two connection channels 7' contained therein. In FIG. 3 the view is as seen from the main combustion chamber 4, FIG. 4 is a vertical cross section through the part 14, while FIG. 5 is a view from the ignition chamber 8. The angle between the central axes of the two channels 7' is preferably approximately 90°. By using two connection channels 7', appropriately disposed, the favorable ignition conditions in the ignition chamber 8 in the region of the spark plug are maintained but, in addition, the ignition process in the main combustion chamber is substantially improved because the two igniter jets now provided together envelop a relatively large area of the main combustion chamber so that the reaction rate in the charge is substantially increased. This rapidity of combustion reduces the tendency of the motor to exhibit detonation so that very lean fuel-air mixtures are still ignitable and a very favorable condition for the emission of NOx components and the fuel consumption is obtainable.

Figure 6:
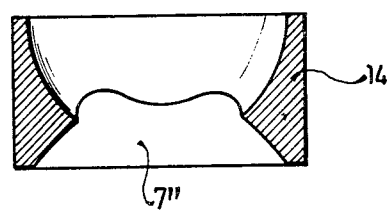

In the exemplary embodiment shown in FIG. 6, the connecting bridge between the two connection channels 7' is omitted so that the now single channel 7" has a crescent-like cross section. FIG. 6 is a vertical cross section of the same type as shown in FIG. 4.

An embodiment with a single channel 7" may be preferable, especially for high performance engines, because the absence of the bridge prevents the formation of hot cells.

Figure 7:
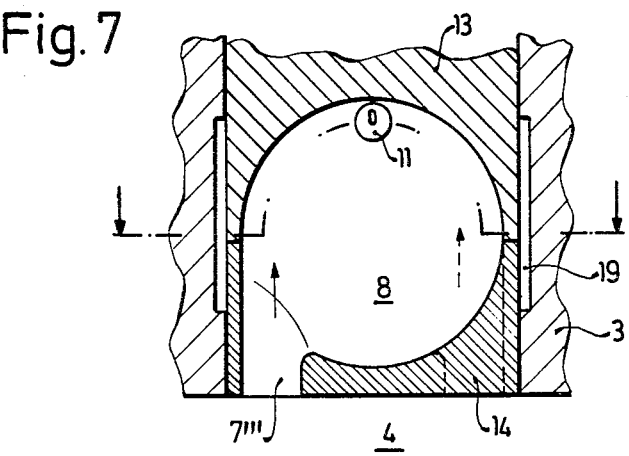
Figure 8:
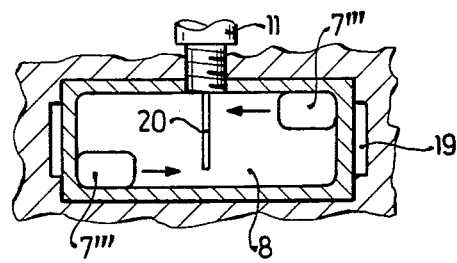
Figure 9:
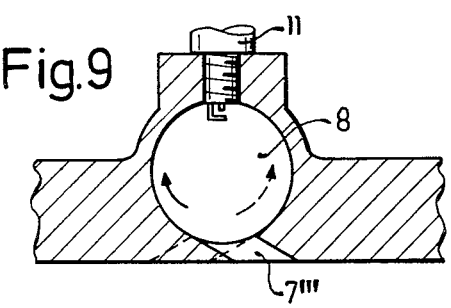
Figure 10:
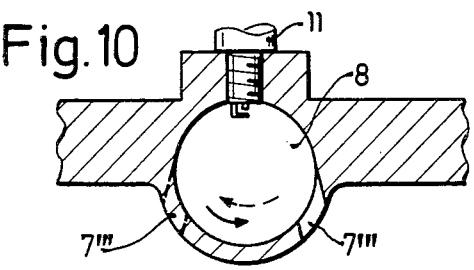

FIGS. 7–10 illustrate ignition chambers in which two connection channels are so arranged as to produce two adjacent vortices having the same axis of rotation. The exemplary embodiment shown in FIGS. 7 and 8 exhibits a cylindrical ignition chamber in which two mutually parallel channels 7'" terminate tangentially. Each of the channels 7'" lies adjacent one end face of the ignition chamber so that two cylindrical swirls are created which rotate adjacent to one another, as may be seen from FIG. 8, where the plane of the swirls is indicated by arrows. Since the direction of motion is opposite in the two swirls, the border region between the two swirls exhibits very high turbulence with very fine micro-vortices and thus will generate a very high flame velocity. This increase of the flame or reaction speed is due to the extremely large velocity gradient existing between the two swirls which also favors and defines the turbulent magnitudes of the transfer of mass, momentum and heat. The rapid reaction in the charge permits late ignition times which, in turn, favor maximum power, so that a good approximation to the so-called constant volume combustion process is possible and the engine does not tend to ping. The geometry of the ignition chamber just described permits an optimum direction of the ignition flames guided from the ignition chamber into the main combustion chamber. If required, the two channels 7'" may cross, as shown in FIG. 9, or they may be in a mutually V-shaped configuration as shown in FIG. 10. It will be understood that an embodiment in which two mutually oppositely rotating vortices are created in a single ignition chamber is not limited to internal combustion engines using a homogeneous charge flow, but is applicable in general to any ignition chamber, in particular those employing stratified charge, and Diesel engines.

In order to improve the ignition of the fuel-air mixture in the ignition chamber, the ignition chamber 8 may be thermally insulated from the cylinder head 3 by an air space 19, as shown in FIG. 7. It is especially favorable if the air space 19 is located at the sides of the ignition chamber 8, especially the sides which are passed by the uncombusted fuel-air gas on its way to the spark plug. Any other thermal insulator may also serve the same purpose.

As illustrated in FIGS. 7 and 8, the primary ignition may take place by means of a single spark plug having a single electrode 20 while the wall of the ignition chamber is the second and ground electrode of the plug. If the main electrode 20 is extended appropriately as shown in FIG. 8, both swirls may be ignited simultaneously. By this embodiment of the spark plug, in which the ground electrode is provided by the walls of the ignition chamber, the spark is forced to traverse the entire fuel-air mixture in the chamber and terminates in the boundary layer at the wall where ignition is particularly favorable.

The ignition process can be further improved by a kind of pre-ionization with the aid of two ignition units 21 disposed in series in the direction of flow of the mixture as illustrated in FIG. 13. Ignition may be initiated simultaneously at both electrodes, or in sequence.

A similar effect may be obtained by using an ignition system having a relatively long duration of ignition and high energy, so that any particles which have been ionized or activated return to the area of the electrodes, after having traveled in the vortex, at a time when the electric spark is still present there. It has also been found to be advantageous if the effective surface of the ignition chamber has a catalytic effect on the combustion. This may be done, for example by manufacturing the insert from the element Nickel.

The connection channels 7, 7', 7", and 7'" have preferably a circular or elliptical cross section. If the ignition chamber exhibits only a single main vortex, and if the cross section of the connection channel is elliptical, it is important that the major axis of the ellipse be parallel to the rotational axis of the vortex. It has been shown to be advantageous in principle if the ratio of the overall cross section of the connection channel or channels to the cross section of the ignition chamber is of the order of 0.1 to 0.4 and preferably 0.15 to 0.3. This change in cross section represents a clear offset of the ignition chamber from the main combustion chamber without having a detrimental effect on the ignition. Preferably, the electrodes 10, 21 of the spark plug 11 are located approximately opposite the point of injection from a single channel or opposite the center of the entry points of several channels. Since it is desirable that the electrical ignition process be well within the boundary layer of the vortex at the wall, the center electrode of the spark plug should extend only a few tenths of a millimeter into the ignition chamber unless, as described above, the wall of the ignition chamber itself provides the ground electrode of the spark plug. When the ignition chamber includes oppositely rotating vortices, and if the ignition process is generally confined to the central plane between the two vortices, the center electrode may then extend further into the ignition chamber without any disadvantageous effects because the flow in this case has the general character of boundary layer flow. The principal condition for all these cases is that the point of ignition is a place where the gases exhibit orderly flow of low velocity and very finely grained turbulence, which results in a minimum ignition delay and a minimum of dispersion of the ignition time. Furthermore, in such a disposition, after ignition has begun, the flame is retained near the spark plug for a certain length of time so that fresh portions of the charge may still be ignited even though the electrical spark is no longer present. Due to the favorable orderly ignition in the ignition chamber, the velocity of the flaming jet in the connection channel 7 may be approximately proportional to the rpm so that the charge reaction in the main combustion chamber can also take place in an approximately rpm-synchronous manner. For this reason, the most favorable timing angles are substantially unaffected by changes in load and rpm. Furthermore, when oppositely rotating vortices are used, the tendency to auto-ignition is much reduced, due to the very high turbulence in the region of contact. When fuel is deposited on the wall, the turbulence causes very favorable vaporization and atomization of the fuel. The very good admixture of air and fuel in a counter-rotating flow is also favorable. Finally, the appropriate disposition of the connection channels causes a very large region of the main combustion chamber to be accessible to the ignition jet and thus leads to a rapid combustion of the charge.

FIGS. 11 and 12 illustrate an example in which the compression chamber 4 is hemispherical and in which the ignition chamber insert 13 partially enters the combustion chamber 4. In order to permit the igniter jets to cover a large portion of the volume of the main combustion chamber, this example provides three channels 7"" which terminate tangentially in the ignition chamber 8' but otherwise extend substantially radially with respect to the axis of the insert. In the examples shown in FIGS. 13 and 14, the insert 13 which includes the ignition chamber 8 is coupled to the cylinder head 3 by a bayonet lock 24 and is secured with a screw 25. This example further shows how the separation of the ignition chamber 8 from the main combustion chamber 4 permits a separate optimization process. The favorable homogenization of the fuel-air mixture is obtained by creating a vortex flow in the main combustion chamber indicated by the arrow and of a type suitable for the requirements of the combustion chamber. In some combustion chambers it may be advantageous if the vortex is generated in the induction tube or at the inlet valve and then enters the combustion chamber 4. In other engines, the vortex may only be generated by a suitable shaping of the combustion chamber. In any case, the fuel preparation in the main combustion chamber may take place independently of anything done in the ignition chamber 8, according to the invention. By providing a fully homogenized fuel-air mixture, moving in orderly manner in the main combustion chamber, and by also providing the above-described embodiments of the ignition chamber 8, which represent independent optimization of the conditions of ignition within the ignition chamber 8, an overall optimized engine operation can be achieved.

The adaptation of the ignition chamber to the main combustion chamber may include forming the connection channel or channels in such a way that the mean direction of the flow out of these channels is guided to the region of the exhaust valve of the engine. In this manner, the detonation usually initiated in that region may be suppressed.

The ignition chamber according to the invention may also be used for rotary piston engines.

Figure 15:
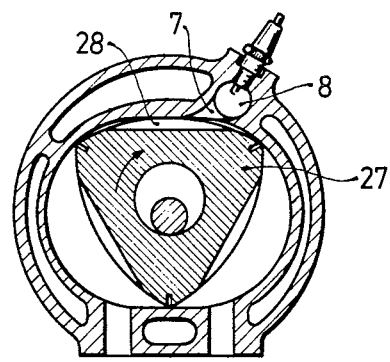
FIGS. 15 and 16 are illustrations of the use of the ignition chamber in a rotary piston engine.
Figure 16:
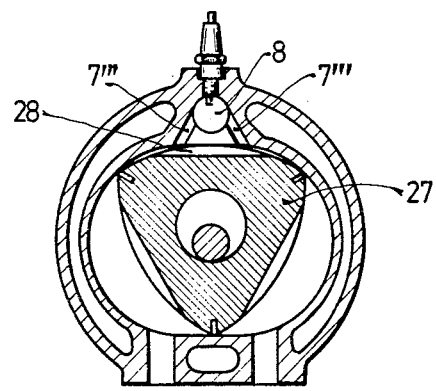

In FIGS. 15 and 16, there are illustrated preferred embodiments of the invention in a rotary piston engine including the rotary piston 27. In both figures, the rotary piston 27 is shown in the position in which ignition has just started in the ignition chamber, i.e., slightly before the compression chamber reaches its smallest volume. Prior to achieving this position, the ignition chamber 8 is connected to the combustion chamber 28 by the rotating piston 27 so that the motion of the charge in the rotating main combustion chamber carries the lean mixture through the channel 7 into the ignition chamber 8.

At the moment of the ignition, in the exemplary embodiment of FIG. 15, the channel 7 is obliquely opposite to the long extent of the combustion chamber 28. Accordingly, the gases emerging from the ignition chamber mix intimately with the main charge in the combustion chamber and the igniting jet covers the charge. Both of these features result in a favorable rapid and uniform reaction in the mixture in the main combustion chamber.

The exemplary embodiment shown in FIG. 16 exhibits several channels 7''' which are provided to obtain a multiple ignition, which is especially favorable in a rotary piston engine which has inherently unfavorable combustion chamber geometry and unfavorable charge motion.

The foregoing represents preferred exemplary embodiments of the invention and it will be understood that numerous other embodiments and variants thereof are possible within the spirit and scope of the invention, the latter being defined by the appended claims.

What is claimed is:

1. In an internal combustion engine which includes a housing, means in said housing defining a main combustion chamber, means for generating a combustible vapor mixture and means for admitting said combustible vapor mixture to said main combustion chamber, the improvement comprising: an ignition chamber defined within said housing and having an arcuately shaped side wall, said ignition chamber being disposed separate from said main combustion chamber and communicating therefrom through two oppositely disposed channels arranged tangentially with respect to said arcuately shaped side wall which terminate in said ignition chamber in such a manner that the flow of combustible vapor from said main combustion chamber into said ignition chamber generates therein two vortices rotating in opposite directions; said main combustion chamber having a minimum volume at the top of the compression cycle which is at least 5 times as great and preferably 10 to 25 times as great as the volume of said ignition chamber; said channels having a flow cross section of between 0.1 to 0.4 and preferably between 0.15 to 0.3 of the cross-sectional area of said ignition chamber; whereby the passage of said vapor mixture into said ignition chamber along said ignition chamber side wall creates therein a vortex flow of homogeneous vapor without supplementary fuel admission to said chamber and without charge stratification.

2. An internal combustion engine as defined by claim 1, wherein said ignition chamber is substantially cylindrical.

3. An internal combustion engine as defined by claim 1, wherein said channel is aimed in the direction of an exhaust valve of said internal combustion engine.

4. An internal combustion engine as defined by claim 1, wherein said two channels are parallel.

5. An internal combustion engine as defined by claim 1, wherein the axes of said channels lie in different planes.

6. An internal combustion engine as defined in claim 1, wherein said ignition chamber includes electric ignition means located substantially diametrically opposite from and medially of the termini of said at least two channels in said ignition chamber, and wherein the center electrode of said electric ignition means does not extend beyond the wall boundary layer of said fuel mixture vortex.

7. An internal combustion engine as defined by claim 1, wherein the surface of said ignition chamber is catalytically effective.

8. An internal combustion engine as defined by claim 1, wherein said ignition chamber is at least partially insulated thermally from said housing.

9. An internal combustion engine as defined by claim 1, further comprising high energy ignition means with an ignition energy of at least 100 mJ per ignition and a duration of ignition of at least 0.5 milliseconds for pre-ionization of gases and subsequent combustion of gases after at least one passage around said vortex.

10. An internal combustion engine as defined in claim 1, wherein said ignition chamber includes electric ignition means located substantially diametrically opposite from and medially of the termini of said at least two channels in said ignition chamber, and wherein one of the electrodes of said electric ignition means is the wall of said ignition chamber.

11. An internal combustion engine as defined by claim 10, wherein the major dimension of the other of said electrodes is substantially parallel to a wall of said ignition chamber and is substantially transverse to the direction of flow of said vapor in said vortex.

12. An internal combustion engine as defined by claim 8, further comprising a separate housing for said ignition chamber, said separate housing being thermally insulated from said engine by air spaces.

13. An internal combustion engine as defined by claim 12, including means for thermally insulating the wall of said ignition chamber lying ahead of said electric ignition means as seen in the direction of flow of mixture in said vortex.

* * * * *